(12) United States Patent
Braightmeyer et al.

(10) Patent No.: US 12,610,938 B2
(45) Date of Patent: Apr. 28, 2026

(54) LIVE CATCH RODENT TRAP

(71) Applicant: Woodstream Corporation, Lancaster, PA (US)

(72) Inventors: Jordan Braightmeyer, Columbia, PA (US); Luke Haney, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

(21) Appl. No.: 18/426,464

(22) Filed: Jan. 30, 2024

(65) Prior Publication Data

US 2025/0241290 A1     Jul. 31, 2025

(51) Int. Cl.
A01M 23/18     (2006.01)

(52) U.S. Cl.
CPC .................................. A01M 23/18 (2013.01)

(58) Field of Classification Search
CPC ...... A01M 23/02; A01M 23/16; A01M 23/18; A01M 23/20; A01M 23/22
See application file for complete search history.

(56) References Cited

U.S. PATENT DOCUMENTS

| | | | | |
|---|---|---|---|---|
| 1,554,079 | A * | 9/1925 | Frick ..................... | A01M 23/18 |
| 6,481,151 | B1 * | 11/2002 | Johnson ................ | A01M 23/04 |
| | | | | 43/69 |
| 7,793,460 | B2 * | 9/2010 | Ha ........................ | A01M 23/18 |
| | | | | 43/61 |
| 7,866,086 | B2 * | 1/2011 | Murchison ............ | A01M 23/08 |
| | | | | 43/66 |
| 10,548,307 | B2 | 2/2020 | Hertzler | |

| | | | | |
|---|---|---|---|---|
| 2002/0011019 | A1 | 1/2002 | Stoico et al. | |
| 2008/0120896 | A1 | 5/2008 | Johnson | |
| 2009/0205244 | A1 * | 8/2009 | Pomerantz ............ | A01M 23/20 |
| | | | | 43/61 |
| 2011/0072708 | A1 | 3/2011 | Nathan et al. | |
| 2012/0174469 | A1 * | 7/2012 | Gardner ................ | A01M 23/18 |
| | | | | 43/60 |
| 2014/0020278 | A1 * | 1/2014 | Smith .................... | A01M 23/36 |
| 2020/0253187 | A1 * | 8/2020 | Files ..................... | A01M 23/18 |

FOREIGN PATENT DOCUMENTS

| | | |
|---|---|---|
| EP | 1919280 B1 | 11/2013 |
| FR | 2795915 A1 | 1/2001 |

OTHER PUBLICATIONS

PCT International Search Report dated May 26, 2025, corresponding to Application No. PCT/US2025/013387, 14 pages.

* cited by examiner

*Primary Examiner* — Joshua J Michener
*Assistant Examiner* — Henry Hooper Mudd
(74) *Attorney, Agent, or Firm* — Barley Snyder

(57)     ABSTRACT

A live catch rodent trap comprises a housing, an entry door, a release or exit door, and a latch assembly. The housing defines a first or entry opening, and a second or release opening. The entry door selectively covers the first opening, enabling a rodent to enter an interior of the trap and to be captured therewithin. The release door is pivotally attached to the housing. The release door is, in response to actuation by a user, movable between a closed position covering the second opening, and a release position at least partially uncovering the second opening and permitting a rodent to exit the interior of the trap. The latch assembly selectively secures the release door in the closed position, and includes an actuator adapted to be engaged or biased by a user for releasing the latch assembly from a latched state.

23 Claims, 6 Drawing Sheets

LIVE CATCH RODENT TRAP

FIELD OF THE INVENTION

The present disclosure relates to pest control devices, and more specifically, to a live catch mouse or rodent trap.

BACKGROUND

Live catch rodent or mouse traps of the prior art include housings having an entry opening which permits a rodent to enter into an interior of the housing. Once inside, the entry opening is closed, capturing the animal within the trap for future release and/or disposal by a user. Removal of a captured rodent in these prior art traps may require the removal of a top cover or a lid of the housing. This process typically requires the utilization of both of the user's hands. In this way, the user cannot release the rodent while holding or positioning the trap at a comfortable distance from themselves. In other words, lid removal via hand requires that the user be in close proximity with the captured rodent in the process of its release. Furthermore, the lid can also be difficult to reattach quickly and correctly, and/or can be lost or misplaced by virtue of its ability to be completely detached from a remainder of the housing. In other prior art traps, one or more doors may be opened to permit the rodent's release. However, operation of these doors is often cumbersome, and may also require the user to remain in close proximity to the door or trap during its actuation, and thus to the live rodent during release.

Improved solutions for releasing a captured rodent from a trap, including enabling the release of the rodent with the user remaining at a comfortable distance therefrom, are desired.

SUMMARY

According to an embodiment of the present disclosure, a live catch rodent trap comprises a housing, an entry door attached to the housing, a release or exit door attached to the housing, and a latch assembly. In one embodiment, the housing defines a first or entry opening, and a second or release opening. The entry door selectively covers the first opening, enabling a rodent to enter an interior of the trap and to be captured therewithin. The release door is movable between a closed position covering the second opening, and an open or release position at least partially uncovering the second opening and permitting a rodent to exit the interior of the trap. The latch assembly selectively secures the release door in the closed position, and includes an actuator adapted to be easily engaged or biased by a user (e.g., remotely and/or with a release force applied briefly and in a single direction) for releasing the latch assembly from a latched state and permitting the release door to move to the open position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
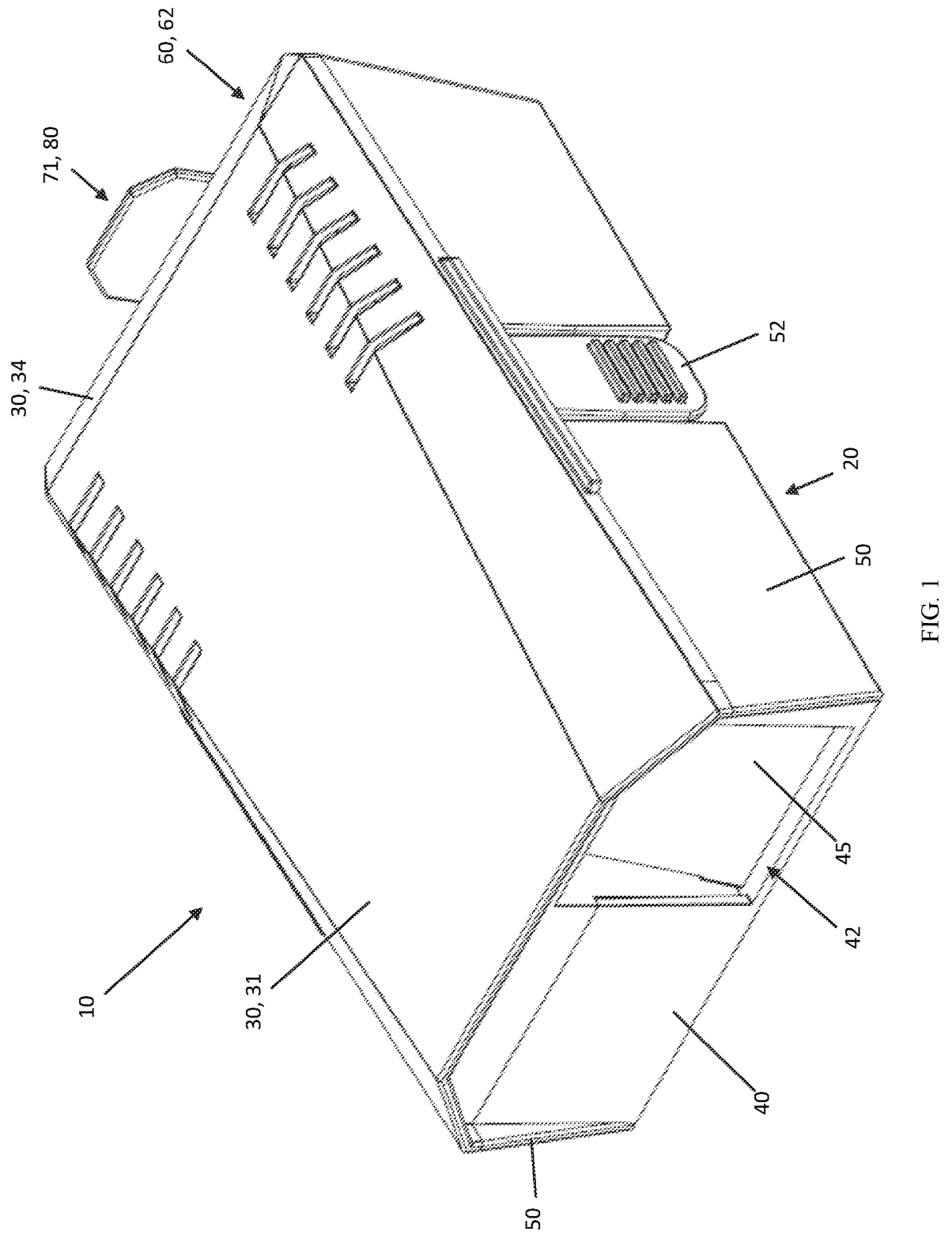
FIG. 1 is a front/top/side orthographic view of a live catch rodent trap according to an exemplary embodiment of the present disclosure.
Figure 2:
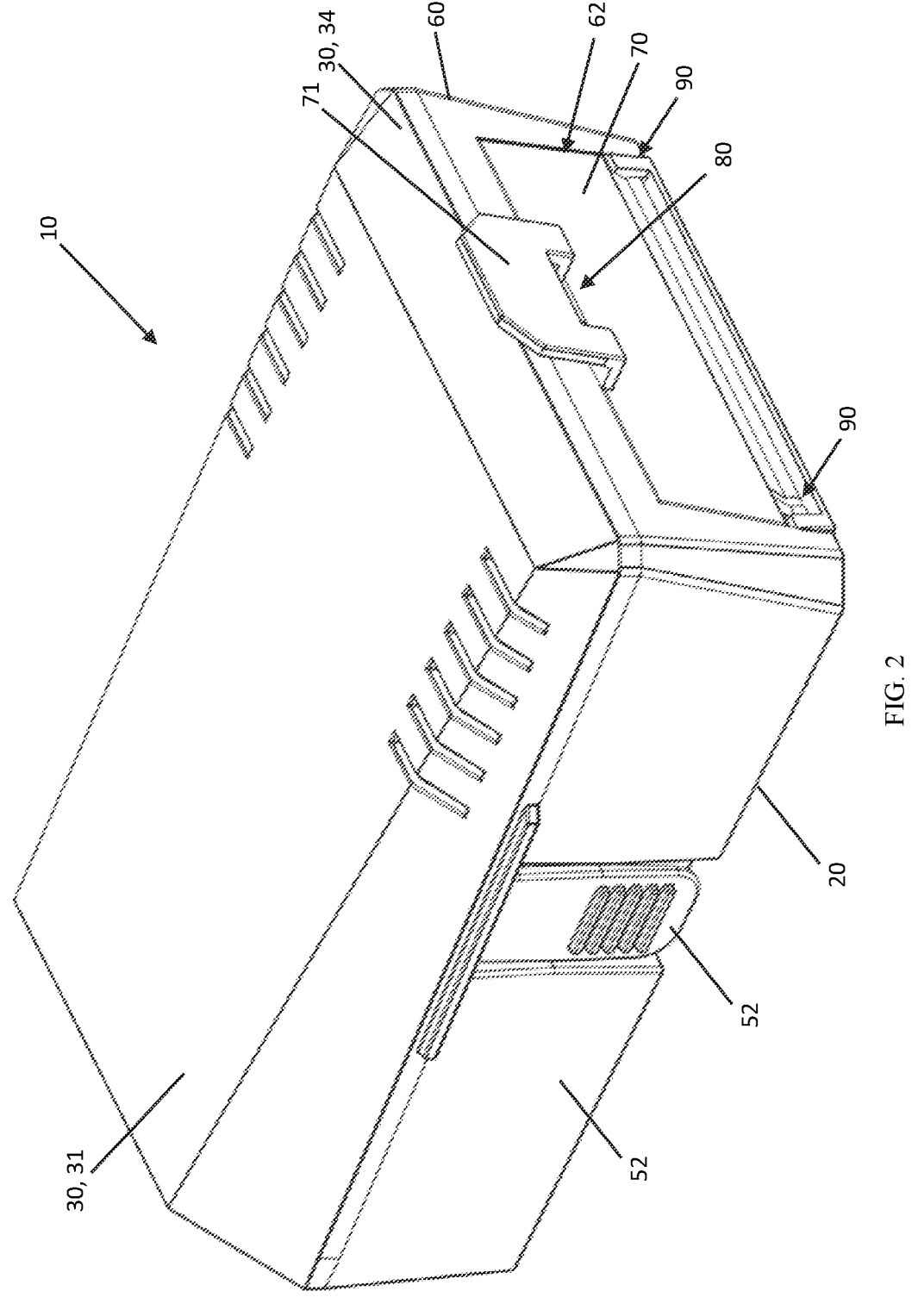
FIG. 2 is a rear/top/side orthographic view of the live catch rodent trap according to the exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a rodent or mouse trap, by way of non-limiting example, a live catch mouse trap. The trap generally comprises a housing, an entry door, a release or exit door, and a latch or latch assembly. In one embodiment, the housing includes a first wall defining a first or entry opening, a second wall defining a second or release opening. The entry door selectively covers the first opening, and more specifically, enables a rodent to enter an interior of the trap and be captured therewithin. The release door is movably (e.g., pivotally) attached to the housing. The release door is, in response to actuation by a user, movable between a closed position covering the second opening, and a release position at least partially uncovering the second opening and permitting a captured rodent to exit the interior of the trap.

The latch assembly is adapted to selectively secure the release door in the closed position and includes a latch arranged on the release door, and a catch arranged on the housing and engaging with the latch in the closed position of the door. An actuator of the assembly is fixedly attached to the release door or the latch. The actuator is adapted to be engaged or biased by a user for releasing the latch assembly from a latched state, and permitting the release door to be moved from the closed position to the release position. In one embodiment, the actuator is adapted to release the latch assembly in response to a pushing force applied by a user, and more specifically, a pushing force applied in a single motion or direction away from the housing. Preferably, the actuator is embodied as a tab extending at least partially vertically at least to a top surface or wall of the trap, and more preferably, above the top surface or wall of the trap. The tab enables a user to release or disengage the latch assembly from the latch state with the application of a simple pushing force (e.g., via their hand, a rod, or other elongated element) applied in a direction generally across the top of the trap. This arrangement also allows the user to remain at a safe distance away from the release door, and thus the rodent as it exits the trap. In some embodiments, once the latch assembly is released, the release door may be automatically (e.g., elastically) biased into the open position. In this way, immediately upon disengagement of the latch assembly, a user may move themselves farther away from the release door. Generally, this arrangement creates easier and safer user interaction with the trap, with less exposure to the rodent during release operations.

Referring generally to FIGS. 1-6, embodiments of the present disclosure include a trap 10 adapted to capture animals (e.g., rodents, mice, etc.). In the exemplary non-limiting embodiment, the trap 10 is a so-called live catch trap adapted to capture an animal or rodent unharmed. The trap 10 generally includes a body or housing defining a base or bottom wall 20, a top wall 30 oriented generally parallel to the bottom wall, a front wall 40, a pair of sidewalls 50 and a rear wall 60. The front wall 40, rear wall 60 and the sidewalls 50 may be formed integrally with the base 20. In the exemplary embodiment, the front wall 40 defines a front opening 42 selectively covered by an entry door 45. The entry door 45 is adapted or configured to function as a one-way passage into an interior of the trap 10. In operation, a rodent may be lured into the trap 10 through the opening 42, and is captured therein as the entry door 45 moves into a closed position.

In the illustrated embodiment, the top wall 30 defines a removable cover or lid of the trap 10. More specifically, a pair of movable latching tabs 52 are attached to the sidewalls 50 (or the top wall 30), and engage with corresponding fixed catches 32 formed on the top wall 30 (or the sidewalls 50). See FIG. 4A. In order to access the interior of the trap 10, a user may actuate the tabs 52, disengaging them from the catches 32, and freeing the cover or top wall 30 for removal. As set forth above, while offering convenient and extensive access to the interior of the trap 10 for baiting and cleaning, this operation is cumbersome and somewhat objectionable when access to the trap interior is desired to remove or release a captured rodent.

In order to address these deficiencies, the trap 10 further includes a rear opening 62 defined through the rear wall 60 and in communication with the trap interior. A rear door 70 is movably (e.g., hingedly or rotatably) mounted to the rear wall 60, and selectively covers the rear opening 62. In the exemplary illustrated embodiment, the rear door 70 is rotatably mounted to the rear wall 60 via a pair of hinge connections 90. In one embodiment, each hinge connection 90 may be defined by a trunnion or cylindrical protrusion defined on one of the rear door 70 or the rear wall 60, that engages with a corresponding recess or hole defined in the other one of the rear door or rear wall. In other embodiments, a discrete axle may be inserted through the rear door 70, with each free end thereof engaging with a recess formed in each side of the rear wall 60 defining the rear opening 62.

Figure 3:
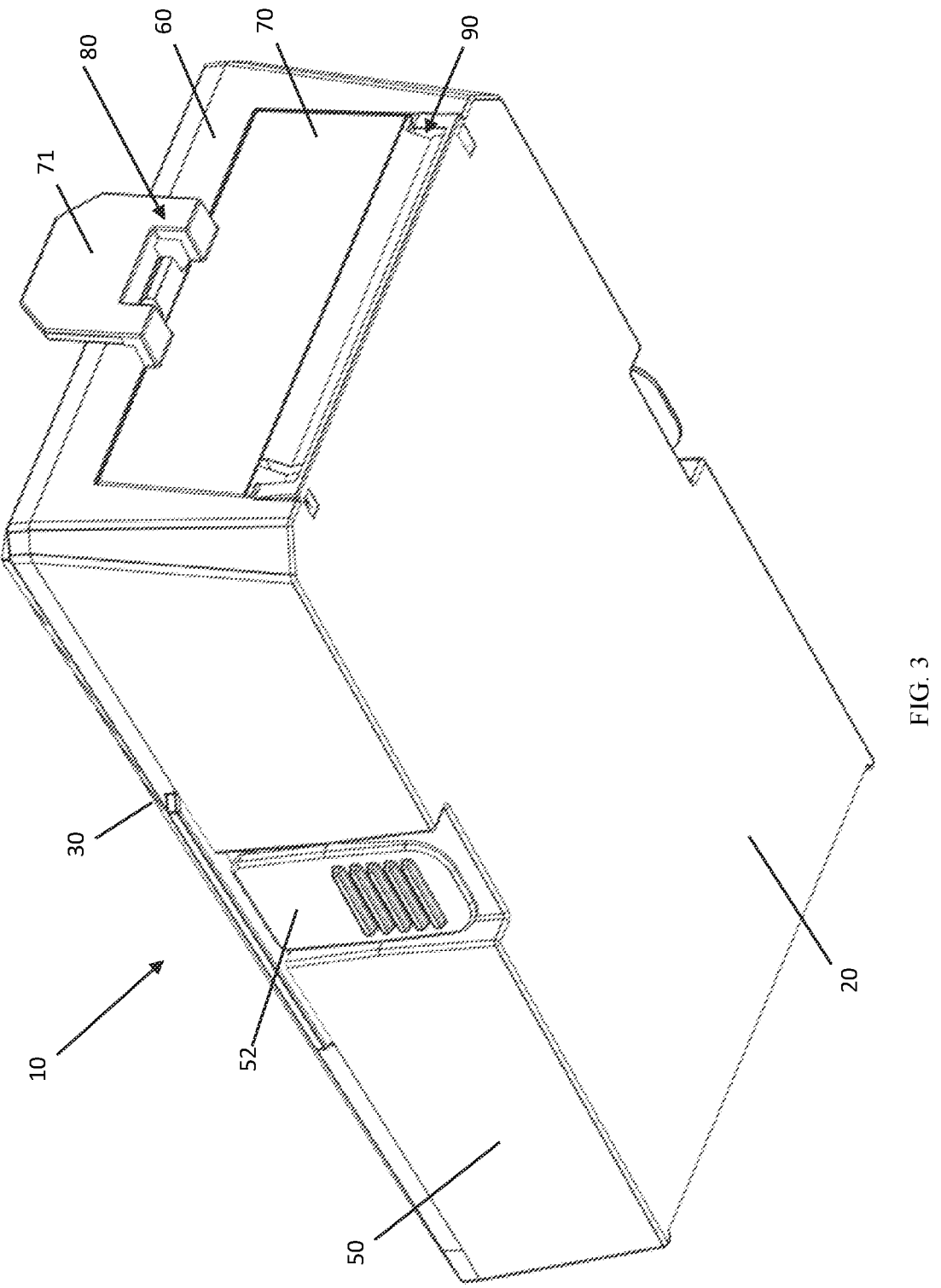
FIG. 3 is a rear/bottom/side orthographic view of the live catch rodent trap according to the exemplary embodiment of the present disclosure.
Figures 4A, 4B:
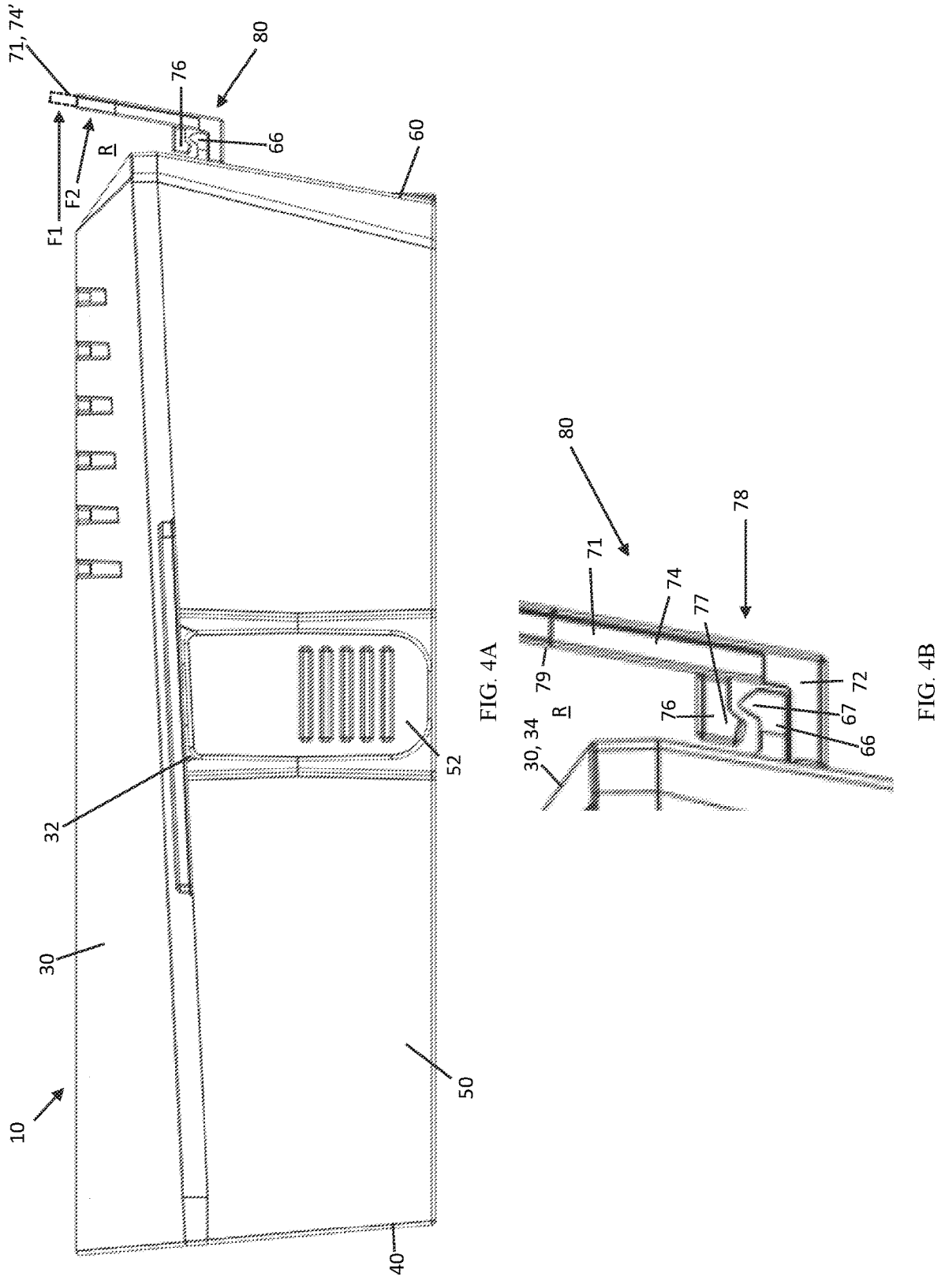
FIG. 4A is a side view of the live catch rodent trap according to the exemplary embodiment of the present disclosure.
FIG. 4B is a detailed side view of a latching mechanism of the live catch rodent trap according to the exemplary embodiment of the present disclosure.
Figure 5:
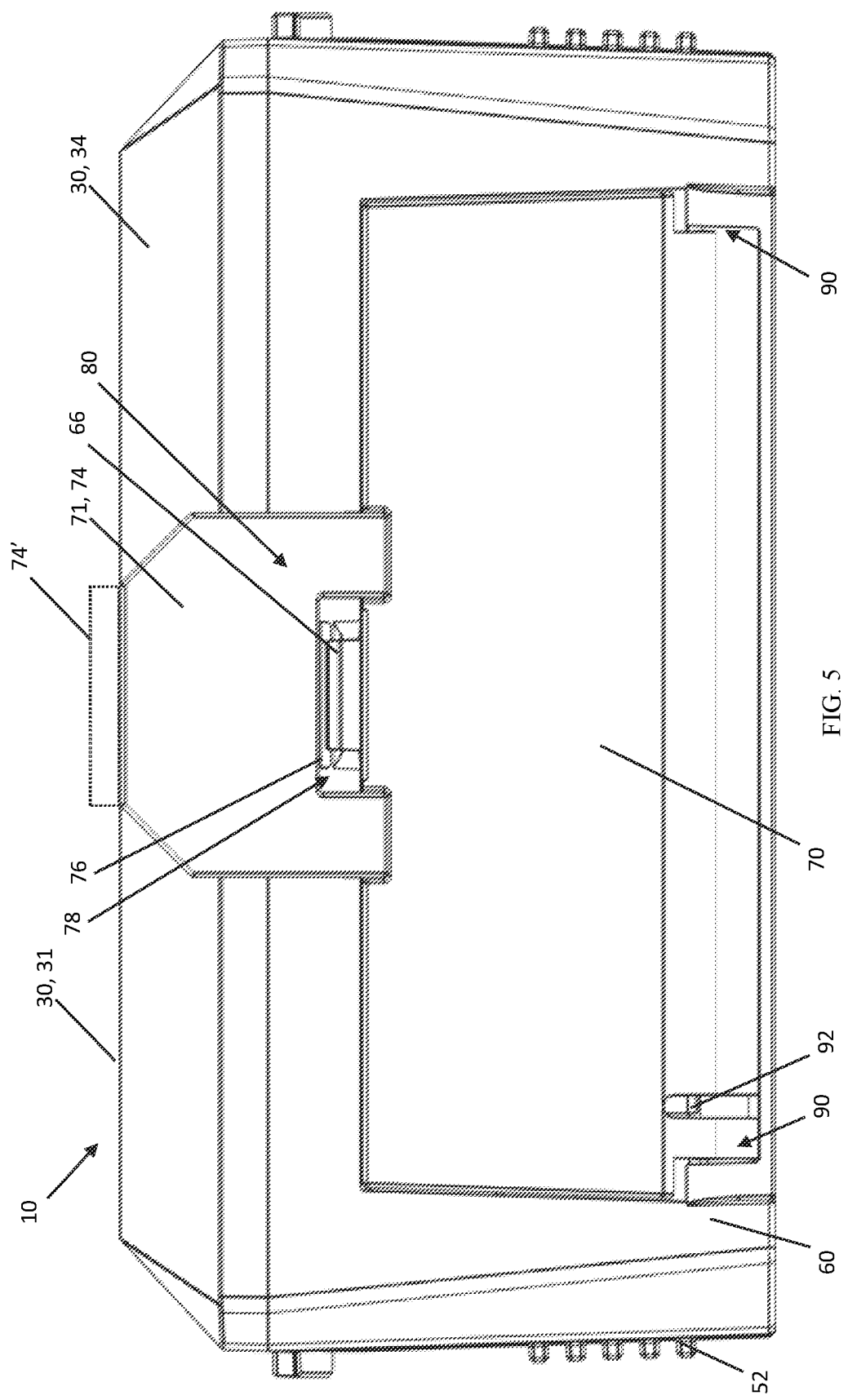
FIG. 5 is a rear view of the live catch rodent trap according to the exemplary embodiment of the present disclosure.
Figure 6:
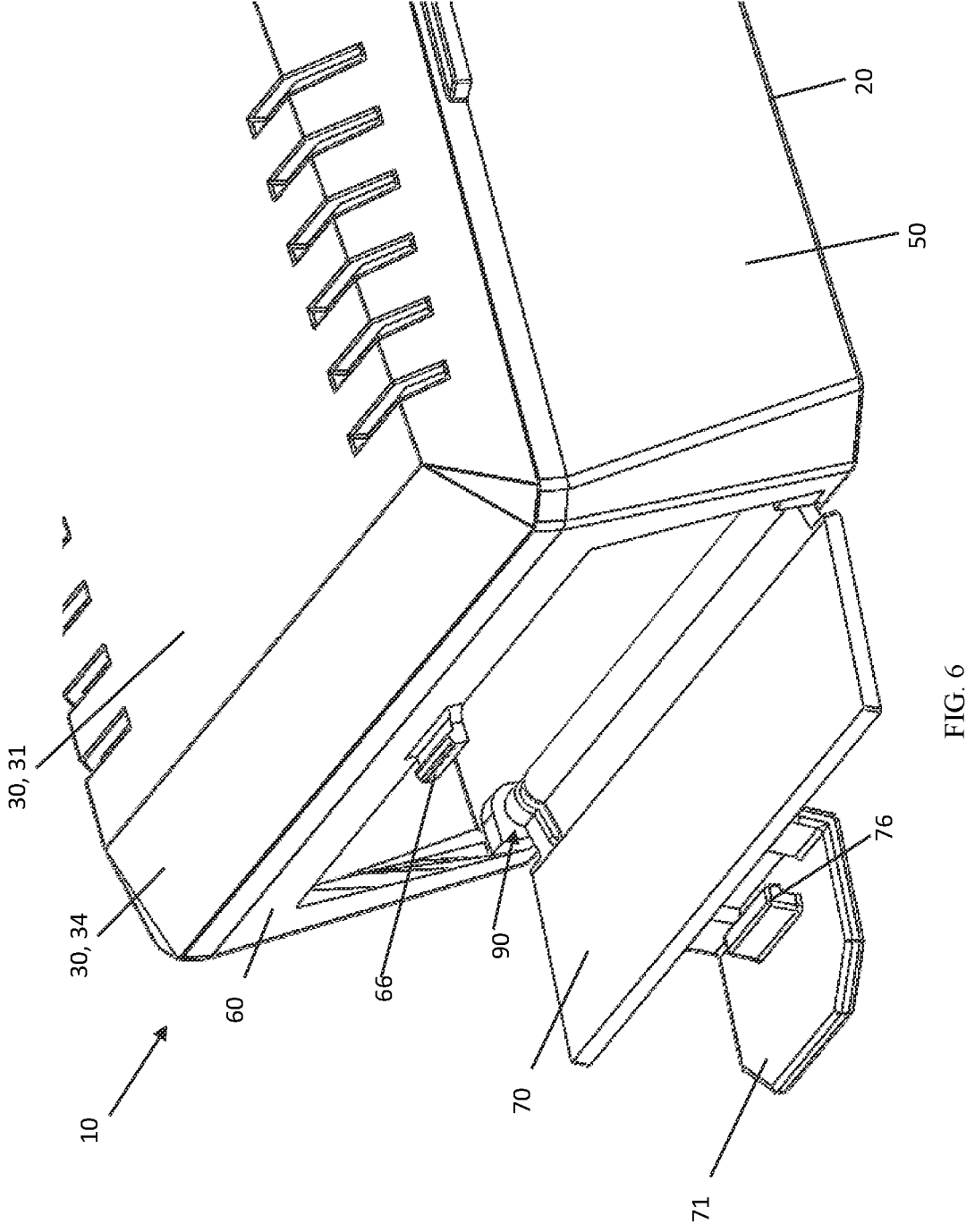
FIG. 6 is a rear/top/side orthographic view of the live catch rodent trap according to the exemplary embodiment of the present disclosure with a rear door thereof in an open position.

As shown most clearly in FIGS. 3-5, a closure assembly is adapted to selective secure the rear door 70 in a closed position. In the exemplary embodiment, the closure assembly is embodied as a latch assembly 80 and includes a catch 66 attached to the housing (e.g., the rear wall 60), a latch 76 attached to the rear door 70, and an actuator or tab 71. In the exemplary embodiment, the tab 71 is formed integrally with the rear door 70 and extends generally vertically upward therefrom with the door in the closed position, or generally parallel to the door. The tab 71 is adapted to release a latching connecting defined between the rear door 70 and the rear wall 60. The catch 66 may be formed integrally with the rear wall 60. Likewise, the latch 76 may be formed integrally with the tab 71 and rear door 70.

In the latched position shown in FIGS. 4A and 4B, the latch 76 and catch 66 are engaged with one another, securing the rear door 70 in the closed position. The tab 71 is generally "L" shaped, and includes a rearwardly extending portion 72 and a vertically extending portion 74 having an optional free end 74' extending above the top wall 20 of the trap 10 in the vertical direction with the rear door 70 in the closed position. A central opening 78 is defined through the tab 71, and is adapted to expose and/or at least partially receive the catch 66 with the rear door 70 in the closed position.

With the rear door 70 in the closed position, the latch 76 extends generally toward a front of the trap 10, and defines a free end 77 extending at least partially in a downward direction. The catch 66 extends in a rearward direction from the rear wall 60, with an upwardly extending free end 67 defined thereon. The free end 67 of the catch 66 is adapted to engage with the free end 77 of the latch 76 in the closed position, with the catch 66 opposing the latch 76 in a direction of motion (i.e., a direction along an arcuate path defined by the hinged connection between the rear door 70 and rear wall 60). In one embodiment, the upwardly extending free end 67 of the catch 66 is tapered, or defines a chamfer, on each side thereof (e.g., at least front and rear sides). Likewise, at least a rearward facing side of the free end 77 of the latch 76 is tapered of chamfered to promote its release. These tapered sides are operative to, for example, promote or aid in both the engagement and disengagement of the latch 76 with the catch 66 as the rear door 70 is moved between the open position (see FIG. 6) and the closed position.

The top wall or cover 30 defines a partially rearward facing section 34 extending obliquely downward from a generally planar horizontal main portion 31 thereof. Similarly, the portion 74 of the tab 71 extends partially rearwardly (along with the rear door 70 and rear wall 60). This creates an expanded recess or access space R between the section 34 of the top wall 30 (or the rear wall 60) and the tab 71. The recess R improves user/release tool access to a front facing side 79 of the tab 71. In the exemplary embodiment, the front facing side 79 of the tab 71 is exposed in a linear horizontal direction F1, as well as in a linear, horizontal and vertically downward direction F2, as shown in FIG. 4A. In this way, a user may release the latch assembly 80 via the application of force originating from the front of the trap 10 (e.g., via reaching with one's hand from the front of the trap toward the rear of the trap, or via the application of force on the tab 71 via a rigid object, such as a stick). As shown, the latch 76 is positioned proximate an end of the tab 71 opposite the free end 74' in the vertical direction. In this way, a resulting force or torque applied on the latch assembly 80 is maximized (i.e., by maximizing the lever arm or tab length). Thus, the user may operate the rear door 70 easily, and from a distance (i.e., a maximum distance with respect to the front of the trap), reducing exposer to the rodent being released from the rear opening 62.

As shown in FIG. 5, an elastic element 92 (e.g., a torsion spring) may be provided between the rear door 70 and the housing or rear wall 60. In one embodiment, the elastic element 92 is adapted to bias the door 70 into the open position. In this way, immediately upon disengagement of the latch assembly 80, a user may move themselves farther away from the door 70, without the need to continually bias the door toward, and/or maintain the door in, the open position.

For at least these reasons, the latch assembly 80 according to embodiments of the present disclosure is specifically adapted (i.e., sized, shaped and located) to optimize release characteristics from a specific position of a user or direction of application of a release force. In this way, these features are more than mere design choice. More specifically, they address a particular problem in the field of rodent traps, and more particularly live catch rodent traps, with a unique solution not taught or suggested by the prior art.

While the closure assembly is described as a latch assembly, it may also be embodied as a magnetic closure assembly (e.g., a magnetic latch or catch), a spring loaded catch, or a friction fit door arrangement, by way of non-limiting example only, without departing from the scope of the present disclosure.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A rodent trap, comprising:
a housing, having:
    a first opening; and
    a second opening;
an entry door selectively covering the first opening and enabling a rodent to enter an interior of the trap, wherein the entry door opens into the interior of the trap;
a release door movably attached to the housing between a closed position covering the second opening and an open position at least partially uncovering the second opening and permitting a rodent to exit the trap, wherein the release door opens away from the interior of the trap;

a closure assembly selectively securing the release door in the closed position, the closure assembly including an actuator adapted to, in response to a pushing force applied thereon by a user, release the closure assembly and enable the release door to move from the closed position to the open position.

2. The rodent trap of claim 1, wherein the actuator defines a protruding tab adapted to release the closure assembly in response to the pushing force applied in a release direction extending generally away from the housing.

3. The rodent trap of claim 2, wherein the release direction is defined from the second opening in a direction away from the housing.

4. The rodent trap of claim 3, wherein the housing includes:
    a first wall defining the first opening;
    a second wall defining the second opening and arranged on a side of the housing opposite the first wall, wherein the release direction is defined generally from the first wall toward the second wall.

5. The rodent trap of claim 1, wherein:
    the housing further includes a top wall; and
    the actuator extends in a vertical direction from the release door to at least a height of the top wall.

6. The rodent trap of claim 5, wherein the actuator extends in the vertical direction to a height above the height of the top wall.

7. The rodent trap of claim 6, wherein the actuator is adapted to release the closure assembly in response to the pushing force acting thereon in a generally horizontal direction and parallel to one of the top wall or a bottom wall of the housing.

8. The rodent trap of claim 5, wherein:
    the actuator extends in the vertical direction and a rearward direction; and
    the actuator is adapted to release the closure assembly in response to the pushing force acting thereon in the rearward direction and a downward direction relative to the housing.

9. The rodent trap of claim 1, wherein the housing includes a removable lid selectively attached to a remainder of the housing.

10. The rodent trap of claim 1, wherein the removable lid includes:
    a generally planar top wall; and
    a rear end portion extending obliquely downward from the top wall, the rear end portion defining a recessed area forward of the actuator.

11. The rodent trap of claim 10, wherein:
    the actuator extends in a vertical direction to a height above the top wall; and
    the actuator is adapted to release the closure assembly in response to the pushing force acting thereon in a horizontal direction and parallel to one of the top wall or a bottom wall of the housing.

12. The rodent trap of claim 10, wherein the actuator is adapted to release the closure assembly in response to the pushing force acting thereon in a generally horizontal and downward direction.

13. The rodent trap of claim 1, wherein the closure assembly comprises a latch assembly, including:
    a latch arranged on the release door; and
    a catch arranged on the housing and engaging with the latch in the closed position of the release door; wherein the actuator is fixedly attached to at least one of the release door or the latch.

14. The rodent trap of claim 13, wherein:

the catch includes a plurality of tapered faces adapted to engage with the latch as the release door is moved from the closed position to the open position and from the open position to the closed position, the tapered faces promoting the release and engagement between the latch and the catch; and the latch defines at least one tapered face engaging with at least one of the plurality of tapered faces of the catch.

15. The rodent trap of claim 13, wherein:

the actuator has a first portion extending from the housing in a rearward direction, and a second portion extending generally vertically from the first portion;

the catch extends in the rearward direction from the housing; and the latch extends in a frontward direction opposite the rearward direction from the second portion of the actuator.

16. The rodent trap of claim 1, wherein the entry door is a one-way passage into the interior of the trap.

17. The rodent trap of claim 1, wherein the interior of the trap is a singular non-partitioned chamber extending between the first opening and the second opening.

18. The rodent trap of claim 1, wherein the entry door and the release door open in a same direction.

19. A rodent trap, comprising:

a housing defining an entry opening and a release opening;

an entry door selectively covering the entry opening, the entry door opens into an interior of the trap;

a release door selectively covering the release opening, the release door opens away from the interior of the trap;

a latch assembly selectively securing the release door in a closed position, including:

a latch arranged on the release door and engaging with the housing in the closed position of the release door; and a tab fixedly attached to at least one of the release door or the latch and adapted to, in response to a pushing force acting in a direction away from the trap, release the latch from the housing and enabling the release door to move from the closed position to an open position wherein the release opening is at least partially uncovered.

20. The rodent trap of claim 19, further comprising an elastic element biasing the release door toward the open position.

21. The rodent trap of claim 19, wherein:

the housing includes a removable top wall; and the tab extends in a vertical direction from the release door to at least a height of the top wall.

22. The rodent trap of claim 21, wherein the tab is adapted to release the latch assembly in response to the pushing force acting thereon in a generally horizontal direction.

23. The rodent trap of claim 19, wherein the latch assembly further includes a rearwardly extending catch formed integrally with the housing and engaging with the latch in the closed position of the release door.

* * * * *